(12) United States Patent
Buban et al.

(10) Patent No.: US 8,225,062 B2
(45) Date of Patent: Jul. 17, 2012

(54) CONTROLLING MEMORY VISIBILITY (75) Inventors: Garret J. Buban, Carnation, WA (US);
Dominic Lai, Redmond, WA (US);
Daniel Rosenfeld, Seattle, WA (US);
Jonathan Westhues, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 12/605,852

(22) Filed: Oct. 26, 2009

(65) Prior Publication Data

US 2011/0099348 A1   Apr. 28, 2011

(51) Int. Cl.
*G06F 12/00* (2006.01)
(52) U.S. Cl. .................... 711/163; 711/115; 711/156
(58) Field of Classification Search .................... None
See application file for complete search history.

(56) References Cited

U.S. PATENT DOCUMENTS

| | | | |
|---|---|---|---|
| 5,644,782 A | | 7/1997 | Yeates et al. |
| 7,016,961 B2 | | 3/2006 | Oeda et al. |
| 2006/0069907 A1 | * | 3/2006 | Lee et al. .................... 713/2 |
| 2008/0215794 A1 | | 9/2008 | Ishii et al. |
| 2009/0037642 A1 | | 2/2009 | Ahn et al. |
| 2009/0106480 A1 | | 4/2009 | Chung |
| 2009/0121028 A1 | | 5/2009 | Asnaashari et al. |
| 2009/0150592 A1 | | 6/2009 | Kuo et al. |

OTHER PUBLICATIONS

"Device Unique Identifiers (DUIDs) for Storage Devices", Retrieved at <<http://msdn.microsoft.com/en-ustlibrary/aa508864.aspx>> Aug. 5, 2009, pp. 1-3.

* cited by examiner

*Primary Examiner* — Shawn X Gu
(74) *Attorney, Agent, or Firm* — Alleman Hall McCoy Russell & Tuttle LLP (57) ABSTRACT

Embodiments are disclosed herein that are related to controlling the visibility of a portion of memory in a hardware device. For example, one disclosed embodiment provides a hardware device comprising a communications interface configured to connect to a complementary communications interface on a computing device. The hardware device further comprises a portion of memory having a first ID configured to cause the portion of memory to be visible to a user of the computing device to which the hardware device is connected. Further still, the hardware device comprises instructions stored in the portion of memory which are executable by and transferable to the computing device to cause the installation of a computer program related to the hardware device, and to cause the portion of memory to be hidden from the user of the computing device upon transferring of the instructions to the computing device.

19 Claims, 5 Drawing Sheets

CONTROLLING MEMORY VISIBILITY

BACKGROUND

Various types of peripheral hardware devices may be used with computing devices. Peripheral hardware devices may include, for example, a keyboard, a mouse, external storage such as a thumb drive, a printer, or the like. Some hardware devices may include a portion of memory which contains a computer program related to the hardware device (e.g., a driver computer program that enables the hardware device to work with the computing device). As such, when the hardware device is connected to a computing device for a first use, the portion of memory is visible to the user of the computing device, allowing the computer program to be installed either automatically or by the user.

However, the portion of memory in which the driver computer program is stored continues to be visible to the user of the computing device after installation of the driver computer program. As a result, in a device such as a thumb drive or other external storage device, there may be two drive letters visible to the user when the thumb drive is connected to the computer. Consequently, the user may become confused as to which drive to open to access mass storage or to access the driver computer program.

SUMMARY

Accordingly, various embodiments are disclosed herein that are related to controlling memory visibility. For example, one disclosed embodiment provides a hardware device comprising a communications interface configured to connect to a complementary communications interface on a computing device. The hardware device further comprises a portion of memory having a first ID configured to cause the portion of memory to be visible to a user of the computing device to which the hardware device is connected. Further still, the hardware device comprises instructions stored in the portion of memory which are executable by and transferable to the computing device to cause the installation of a computer program related to the hardware device, and to cause the portion of memory to be hidden from the user of the computing device upon transferring of the instructions to the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments are disclosed herein that relate to controlling a visibility of a portion of memory on a peripheral hardware device after transferring a computer program stored in the portion of memory to a computing device. It will be understood that the term "hardware device," "peripheral hardware device," and the like as used herein may include any suitable device configured to connect to a computing device, including but not limited to, external mass storage devices such as thumb drives, optical drives, magnetic drives, as well as other peripheral devices such as keyboards, mice and other pointing devices, printers, scanners, fax machines, games controls such as joysticks, speakers, etc.

Figure 1:
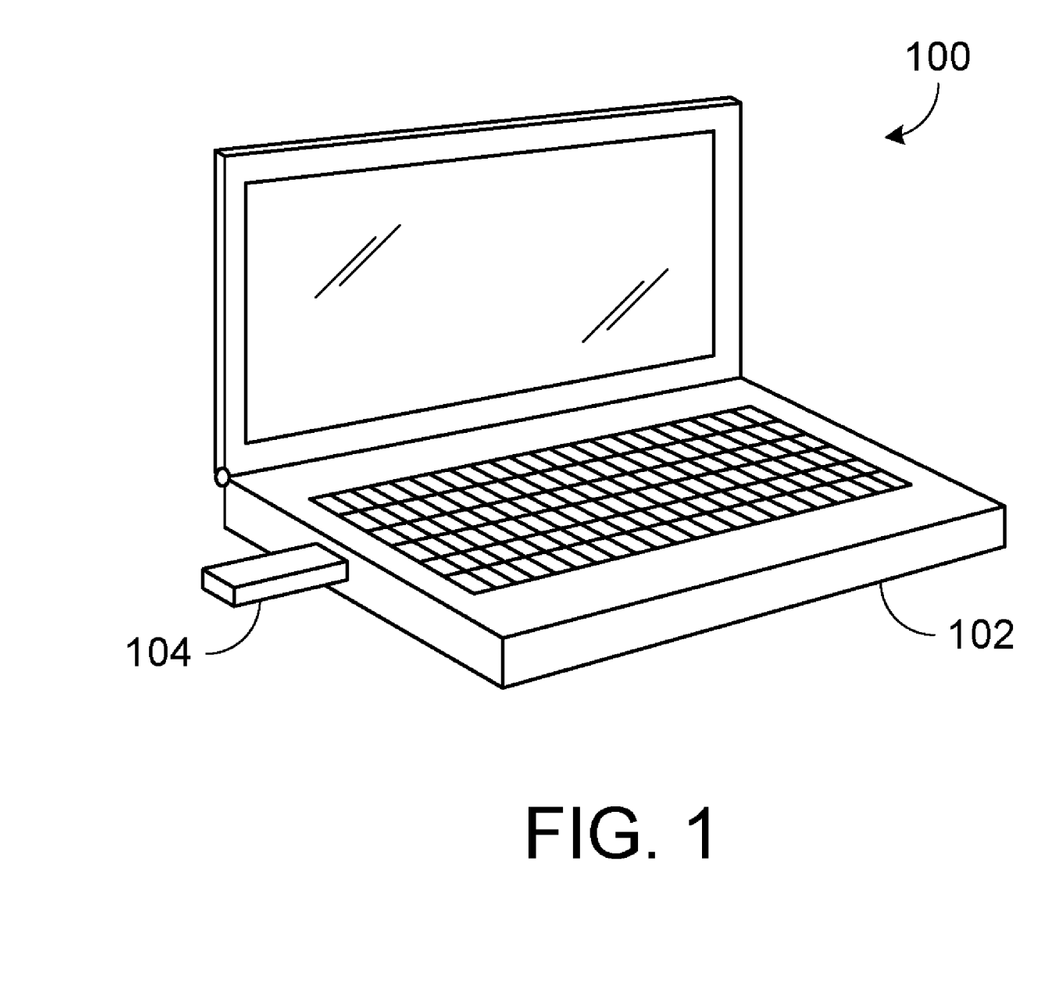
FIG. 1 shows a view of an example embodiment of a hardware device use environment.

Before describing embodiments of methods for controlling the visibility of memory in a peripheral hardware device, various example embodiments of hardware devices and use environments are described with reference to FIGS. 1-4. First, FIG. 1 shows an embodiment of a hardware device use environment 100. Hardware device use environment 100 comprises a computing device in the form of a laptop computer 102 to which a hardware device in the form of a thumb drive 104 is connected. Thumb drive 104 and laptop computer 102 are configured to be connected via a communications interface on the thumb drive 104 and a complementary communications interface on the laptop computer 102, thereby allowing data to be transferred between the laptop computer 102 and the thumb drive 104. In the depicted embodiment, the thumb drive is connected to the computer via a wired communications interface, such as a USB (Universal Serial Bus) interface. However, it will be understood that the term "communications interface" as used herein may include any suitable communications interface that enables communication between a computing device and a peripheral hardware device, including but not limited to other wired interfaces such as a IEEE 1394 high speed serial bus port, etc., as well as wireless interfaces such as a Bluetooth interface, etc. It will further be understood that hardware device environment embodiment 100 depicted in FIG. 1 is shown for the purpose of example, and is not intended to be limiting in any manner.

Figure 2:
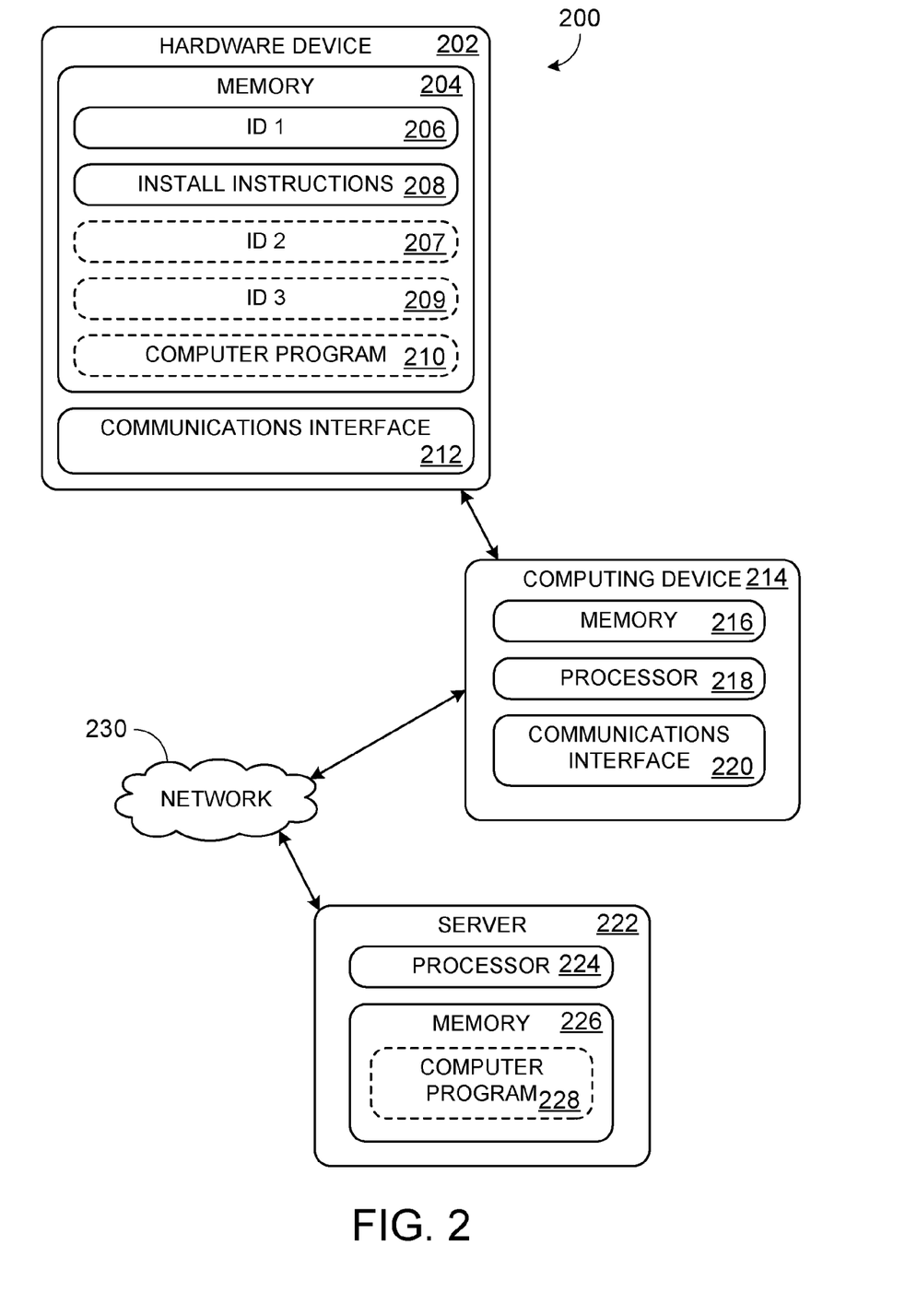
FIG. 2 shows a block diagram of another example embodiment of a hardware device use environment.

FIG. 2 shows a block diagram of an embodiment of a hardware device use environment 200, where a hardware device 202 is shown in communication with a computing device 214. Hardware device 202 comprises memory 204 and a communications interface 212. Memory 204 may be a portion of the total memory on the device, and is identified to a computing device via a first identification ("ID") 206, shown as ID 1. Further, memory 204 may contain a computer program 210, such as a hardware device driver program, stored thereon. As described in more detail below with regard to FIGS. 3-4, a hardware device also may comprise a second portion of memory, such as mass storage, memory associated with an on-board controller, etc. that comprises an ID distinct from the first ID. In such embodiments, the first ID may identify the memory as read-only so that a user does not write information to memory 204. In other embodiments, as described below, the computer program may be stored on a remote server or other location not local to hardware device 202.

The first ID 206 may be initially configured to cause the memory to be visible to a user of the computing device 214 to which the hardware device 202 is connected. Thus, when a purchaser of the hardware device 202 first connects the hardware device 202 to the computing device 214, memory 204 is visible to a user of the computing device, for example, as a drive icon displayed on a graphical user interface.

Memory 204 further comprises executable instructions 208 for installing the computer program 210, wherein the instructions 208 are transferable to and executable by to the computing device 214 to enable such installation. The instructions 208 are also executable to cause the memory 204 to be hidden from the user of the computing device 214 upon transferring of the instructions to the computing device 214. For example, in one embodiment, once the instructions are transferred, the computing device 214 may hide the memory 204 by mapping the first ID 206 to a NULL driver after the instructions are transferred to the computing device 214. In other embodiments, memory 204 may be hidden in any other suitable manner.

In some embodiments, memory 204 may include instructions executable by computing device 214 to change the ID to a second ID 207 or a third ID 209. As will be described in greater detail below, in some situations, a user may request to access memory 204 after memory 204 is hidden. In such situations, the memory 204 may be may be assigned the second ID 207 or third ID 209 to cause memory 204 to be visible again. The use of both a second ID 207 and a third ID 209 may allow the memory to be identified as read-only or as read/write, depending upon the circumstances surrounding the request to make memory 204 visible.

Further, the hardware device 202 may remain connected to the computing device 214 when the computing device is turned off. In such a situation, upon restart of the computing device 214, the portion of memory 204 may default to ID 1 206. In this manner, memory 204 may be hidden to the user of the computing device 214 upon start-up until another ID is requested, as will be described with reference to FIG. 6.

Continuing with FIG. 2, computing device 214 comprises memory 216 configured to store computer-readable instructions, such as applications and other programs, and a processor 218 configured to execute the applications and other programs stored in memory 216. Generally, programs include routines, objects, components, data structures, and the like that perform particular tasks or implement particular abstract data types. The term "program" as used herein may connote a single program or multiple programs acting in concert, and may be used to denote applications, services, or any other type or class of program. Computing device 214 further comprises communications interface 200, such as a wireless or wired communication interface, that is complementary to communications interface 212 of hardware device 202.

Computing device 214 may be in communication with a remote server 222 via a network 230. Network 230 may represent any combination of data networks, mobile networks, and other networks over which devices may transmit data. In the depicted embodiment, one computing device and one server are shown in communication with the depicted generic network for the purpose of example, but it will be understood that any suitable number of computing devices and/or servers may be in communication with any suitable number of networks.

Server 222 is shown comprising a processor 224 and memory 226 comprising a computer program 228 stored therein, wherein computer program 228 comprises a driver program for hardware device 202, an update to a driver program stored on hardware device 202, or is otherwise related to the hardware device 202. As such, the install instructions 208 stored in memory 206 on hardware device 202 may be executable by computing device 214 to direct the computing device 214 to download computer program 228 from server 222.

Figure 3:
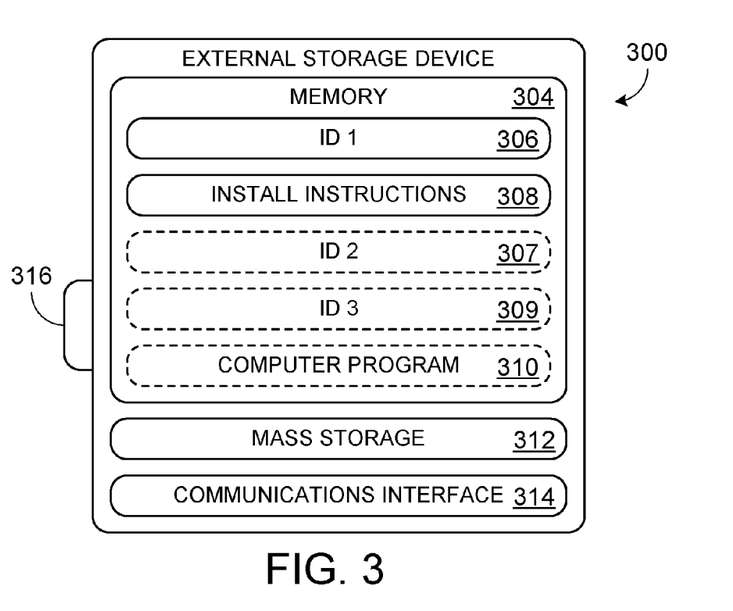
FIG. 3 shows a block diagram of an example embodiment of an external storage device.

FIG. 3 shows a more detailed embodiment of a peripheral hardware device in the form of an external storage device 300, such as a thumb drive, an optical drive, a magnetic drive, a portable media player, a smart phone, or any other suitable hardware device that is connectable to a computing device. External storage device 300 comprises a portion of memory 304 configured to store a driver computer program or other program related to the external storage device 300, another portion of memory in the form of mass storage 312, identified by a different ID (not shown) than portion of memory 304, and a communications interface 314 for connecting the external storage device 300 to a computing device.

The depicted portion of memory 304 is shown as being identified by a first ID 306 ("ID 1") and comprising a driver computer program 310. As described above, the first ID 306 identifies the portion of memory in which the computer program is stored. The portion of memory 304 also comprises install instructions 308 transferable to and executable by the computing device to install the driver computer program 310, and to cause the portion of memory 304 to be hidden from the user of the computing device upon transferring the driver computer program 310 to the computing device. As described above, in other embodiments, the computer program 310 may be stored on a remote server, and the install instructions may direct a computing device to download the driver computer program from the remote server.

Memory 304 may further include instructions executable to change the ID to a second ID 307 ("ID 2") or a third ID 309 ("ID 3"). The identity of portion of memory 304 may be changed from ID 1 to ID 2 or ID 3 when it is desired to make portion of memory 304 again visible. For example, external storage device 300 may include a control such as a button 316 shown in FIG. 3 actuable by the user to make the portion of memory visible to the user after it is hidden. For example, if a user wishes to access the instructions stored in the portion of memory 304 to reinstall the driver, the user may request access by pressing button 316. In response, the computing device may change the identity of the portion of memory 304 to ID 2 307. In some embodiments, ID 2 may identify the portion of memory as read only such that the user may not modify the instructions.

As another example, at times a new or updated version of the computer program may become available on a server in communication with the computing device. In such an example, it may be desired to update computer program 310 stored on hardware device 300 with the new or updated version. In this case, the computing device may change the identity of the memory to a third ID 309 ("ID 3") that causes the portion of memory 304 to be visible to the user. ID 3 309 may identify the memory as read/write, thereby allowing the new or updated version of computer program 310 to be written to portion of memory 304.

Figure 4:
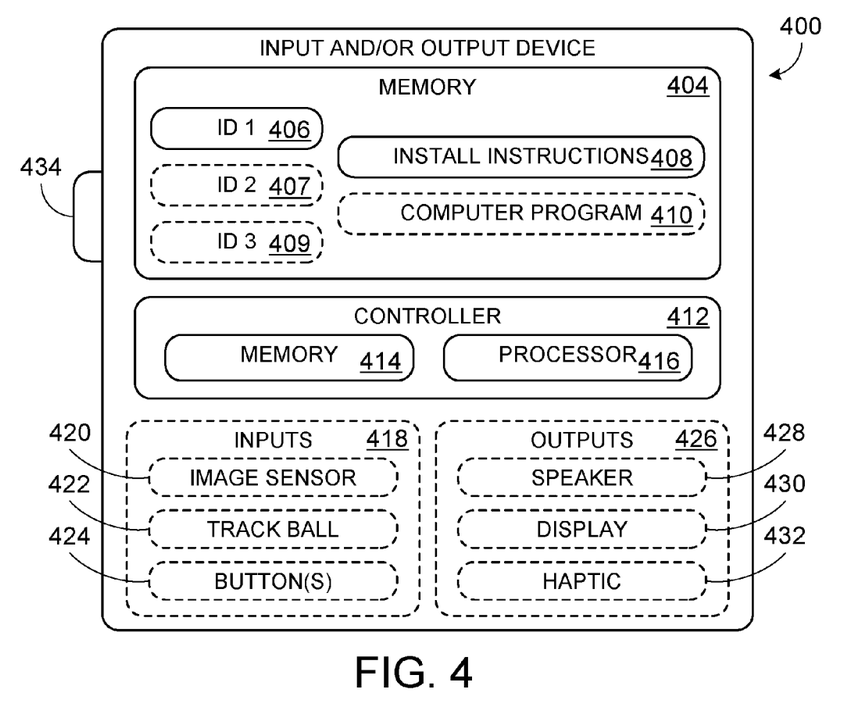
FIG. 4 shows a block diagram of an example embodiment of an input and/or output device.

Next, FIG. 4 shows another example of a hardware device in the form of an input and/or output device 400. Input and/or output device 400 may take the form of any suitable peripheral input and/or output device, including but not limited to a mouse, a keyboard, speakers, printer, portable media player, etc. Input and/or output device 400 comprises a portion of memory 404 that comprises a first ID 406 that identifies portion of memory 404, a set of install instructions 408, and a computer program 410, wherein the install instructions 408 are transferable to and executable by a computing device to cause the installation of computer program 410. Further, the portion of memory 404 may comprise instructions executable to change the ID to a second ID 407 or a third ID 409. As described above, after the portion of memory is hidden, the identity of the memory may be changed to ID2 or ID3 if the portion of memory is requested by the user of the computing device or the computing device itself, as described above.

Input and/or output device 400 also includes a controller 412 comprising a second portion of memory 414, and also a processor 416. Memory 414 contains instructions, such as firmware, executable by the processor 416 to perform various functions related to the operation of the input and/or output device 400. For example, where the input and/or output device is a computer mouse, the controller 412 may receive input from an image sensor and provide output in the form of a motion signal for a computing device. Input and/or output device 434 may further comprise a control 434 actuable by a user for requesting to make the portion of memory 404 visible to the user after it is hidden, as described above.

Input and/or output device further may comprise one or more user inputs 418 and outputs 426. For example, the inputs 418 may include, but are not limited to, an image sensor 420, a track ball 422, one or more buttons 424 for providing data and/or control signals to the computing device, etc. Further, the outputs 426 may include, but are not limited to, a speaker 428, a display 430, a haptic output 432 (e.g., a vibration generator), etc. It will be understood that these specific inputs and outputs are described for the purpose of example, and are not intended to be limiting in any manner.

Figure 5:
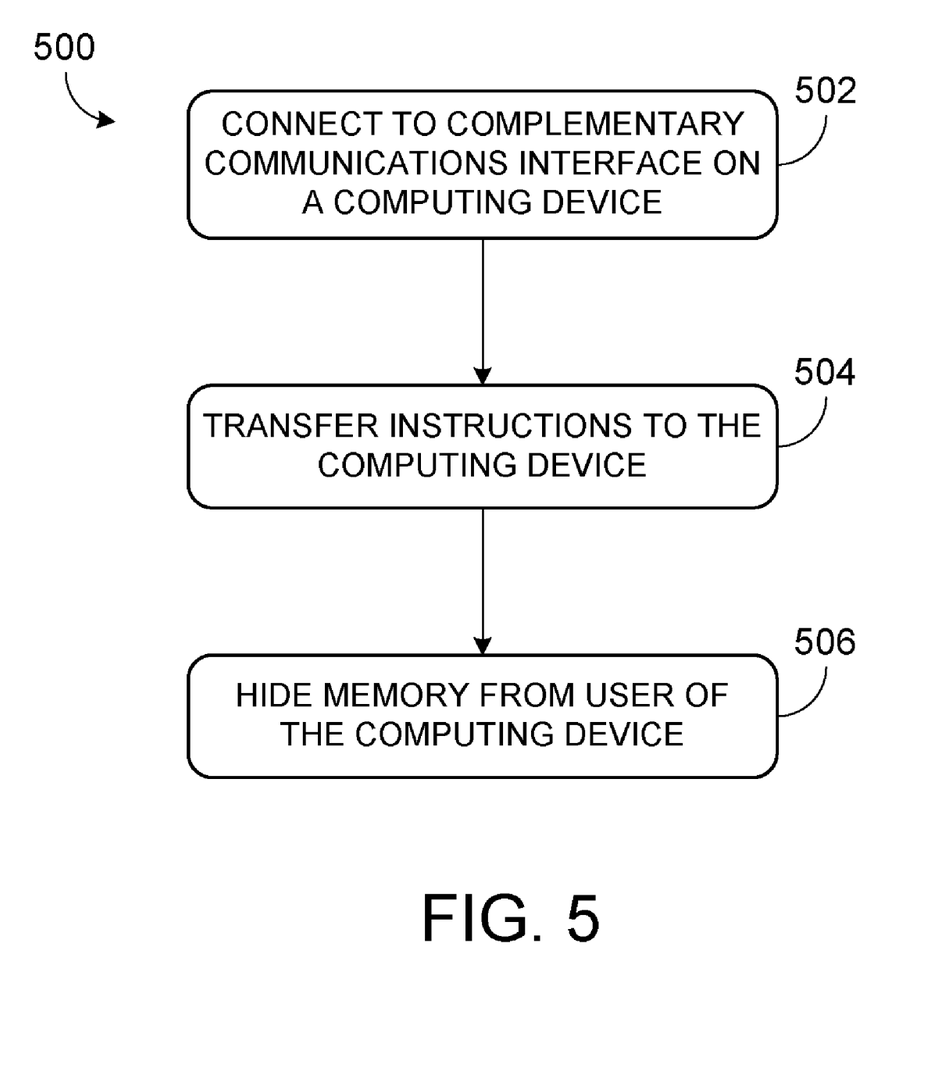
FIG. 5 shows a flow diagram that depicts an example embodiment of a method for transferring a computer program stored on a hardware device to a computing device.

Referring next to FIG. 5, a flow diagram depicting an embodiment of a method 500 for transferring a computer program stored on a hardware device to a computing device is shown. The depicted method 500 may apply to any suitable hardware device, including but not limited to the embodiments of hardware devices 104, 202, 302, and 402 described herein.

At 502 of method 500, the hardware device is connected to a complementary communications interface on a computing device. As one example, an external hardware device may be connected via a USB port, a IEEE 1394 high speed serial bus port, a wireless communications interface such as a Bluetooth interface, or in any other suitable manner.

Once a connection is established, method 500 proceeds to 504, where install instructions are transferred to the computing device. As described above, the instructions may be configured to cause installation of a hardware device driver program or other suitable computer program. Such program may be stored on the hardware device, or may be stored remotely, in which case the instructions may comprise a pointer to a remote location from which the computer program may be downloaded or otherwise accessed.

Upon transferring of the instructions, method 500 continues to 506, where the portion of memory containing the instructions is hidden from the user of the computing device. The portion of memory may be hidden from the user in any suitable manner. For example, in some embodiments, the computing device may hide the portion of memory by mapping the ID of the memory to a NULL driver. In other embodiments, the portion of memory may be hidden in any other suitable manner. In any event, after the portion of memory is hidden from the user, the portion of memory is no longer visible to a user of a computing device to which the hardware device is connected.

Figure 6:
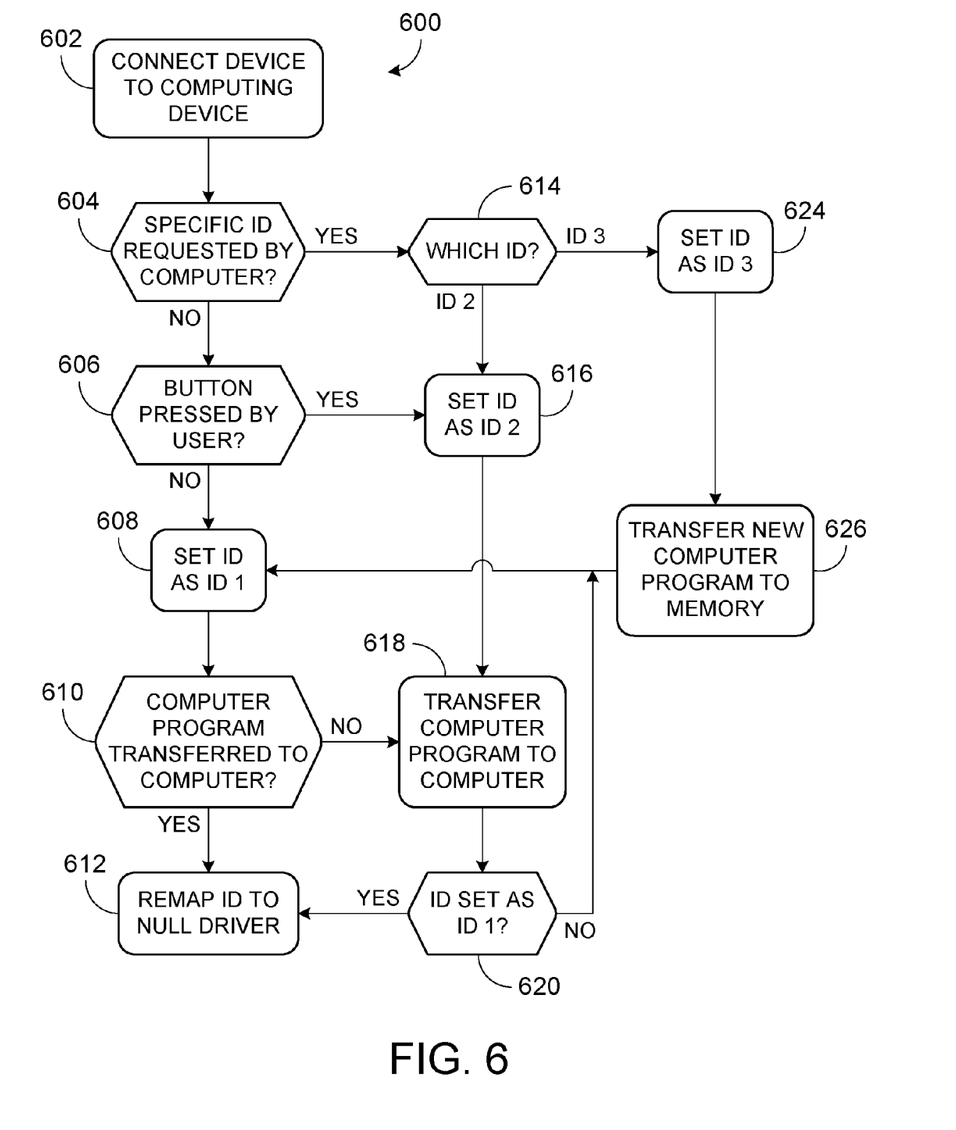
FIG. 6 shows a flow diagram that depicts another example embodiment method for transferring a computer program stored on a hardware device to a computing device.

Method 500 may be implemented in any suitable manner, depending upon particular hardware device and use environment. FIG. 6 shows a flow diagram of an example embodiment of a more detailed method 600 for transferring a computer program stored on a hardware device to a computing device. It will be understood that the depicted method 600 may be implemented in any suitable hardware device, including but not limited to the embodiments of hardware devices 104, 202, 302, and 402 disclosed herein.

First, at 602, the hardware device is connected to a computing device. As mentioned above, the hardware device may be any suitable hardware device connectable to a computing device that has a complementary communications interface. Next, After the hardware device is connected to the computing device, method 600 comprises, at 604, determining if the computing device requested a specific ID from the hardware device. For example, such a request for a specific ID may be received from the computing device if the computing device is aware of an updated or new version of a computer program stored on the hardware device. If the computing device did not request a specific ID, method 600 continues to 606 where it is determined if the user has pressed a button on the device. As described above, the button may be a control which the user actuates to make a portion of memory containing a hardware device driver computer program visible so that the user may access the driver computer program for reinstallation, etc.

If is determined that the user did not press the button on the hardware device, method 600 proceeds to 608 where the ID is set as ID 1. Once the ID is set as ID 1, the method continues to 610 where it is determined if the computer program (e.g., hardware device driver program) was transferred to the computer. If it is determined that the computer program was transferred to the computer, method 600 continues to 612 where the ID is remapped to a NULL driver and the portion of memory identified by ID 1 is hidden from the user of the computing device.

Referring back to 604 of method 600 in FIG. 6, if it is determined that a specific ID is requested by the computing device, method 600 moves to 614 where it is determined which ID was requested. If is determined that the computing system requested ID 3 (which, as described above, identifies the portion of memory as read/write), method 600 moves to 624 where the identity of the portion of memory is set as ID 3. Once the ID is set to ID 3, the method proceeds to 626, where a new computer program is transferred and written to the memory. It will be understood that the term "new computer program" comprises either an entirely new program that is entirely written over the computer program previously stored, or an updated program that replaces only portions of the computer program stored in the portion of memory. After the new computer program is transferred to the memory, method 600 moves to 608, where the ID is set as ID 1 and the memory may once again be hidden from the user.

On the other hand, if ID 2 was requested, method 600 proceeds to 616 where the identity of the portion of memory is set as ID 2. Similarly, if it is determined at 606 that the user has pressed the button to make the memory visible, the method 600 proceeds to 616 where the identity of the portion of memory is set as ID 2. As described above, ID 2 makes the memory visible to the user of the computing device and identifies the memory as read only. Once the identity of the portion of memory is set to ID 2, method 600 continues to 618 where the computer program is transferred to the computing device. Likewise, if it is determined at 610 that the computer program has not been transferred to the computing device, method 600 proceeds to 618.

Once the computer program is transferred to the computing device at 618, method 600 continues to 620, where it is determined if the identity of the portion of memory is set as ID 1. If it is determined that the ID is set as ID 1, the method moves to 612 where the ID is remapped to the NULL driver and the memory is no longer visible to the user of the computing device. If it is determined that the ID is not set as ID 1, the method moves to 608 where the ID is set as ID 1 and the memory may once again be hidden from the user.

In this manner, the visibility of at least a portion of memory on a peripheral hardware device may be controlled. If the portion of memory is not requested by the computing device or a user thereof, the portion of memory may be hidden by remapping its ID to a NULL driver, for example. Once hidden, the memory may be requested to be made visible again so that, for example, a hardware device driver program may be updated and/or reinstalled. It will be understood that the mapping to the NULL driver may be non-volatile such that this mapping is not lost when the computing device is powered down. As such, the portion of memory may remain hidden at each power-on cycle of the computing device.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A peripheral hardware device comprising:
a communications interface configured to connect to a complementary communications interface on a computing device;
a portion of memory having a first identification (ID) configured to cause the portion of memory to be visible to a user of the computing device to which the hardware device is connected; and
instructions stored in the portion of memory which are executable by and transferable to the computing device to cause an installation of a computer program related to the hardware device, and to cause the portion of memory to be hidden from the user of the computing device upon transferring of the instructions to the computing device.

2. The hardware device of claim 1, wherein the instructions are executable by the computing device to cause the portion of memory to be hidden by mapping the first ID to a NULL driver.

3. The hardware device of claim 1, wherein the first ID identifies the portion of memory as read only.

4. The hardware device of claim 1, further comprising a control disposed on the device and configured to be actuated by the user when the portion of memory is hidden from the user to make the portion of memory visible to the user.

5. The hardware device of claim 4, further comprising instructions executable to change the first ID to a second ID that causes the portion of memory to be visible to the user when the user actuates the control.

6. The hardware device of claim 5, wherein the second ID identifies the portion of memory as read only.

7. The hardware device of claim 1, wherein the hardware device further comprises instructions executable to detect a new version of the computer program, and when a new version of the computer program is detected, to set the first ID to a third ID causing the portion of memory to be visible to the user.

8. The hardware device of claim 7, wherein the third ID identifies the portion of memory as read/write.

9. In a peripheral hardware device, a method for transferring a computer program stored in a portion of memory in the hardware device to a computing device, the method comprising:
connecting to the computing device;
presenting to the computing device a first identification (ID) that identifies the portion of memory in which the computer program and install instructions are stored, the install instructions comprising instructions executable by the computing device to cause the portion of memory to be hidden by remapping the first ID;
transferring the computer program from the portion of memory to the computing device;
transferring the install instructions; and
upon transferring the computer program to the computing device, causing the portion of memory to be hidden from an user by remapping the first ID.

10. The method of claim 9, wherein the portion of memory is hidden by remapping the first ID to a NULL driver.

11. The method of claim 9, wherein the first ID identifies the portion of memory as read only.

12. The method of claim 9, further comprising, after causing the portion of memory to be hidden from the user, receiving a user request to access the portion of memory and, in response to the request, changing an identity of the portion of memory to a second ID that causes the portion of memory to be visible to the user, and wherein the second ID identifies the portion of memory as read only.

13. The method of claim 12, wherein the user request is generated when the user actuates a control on the hardware device.

14. The method of claim 9, further comprising:
after causing the portion of memory to be hidden, receiving a request from the computing device to change an identity of the portion of memory to a third ID that causes the portion of memory to be visible to the user, wherein the third ID identifies the portion of memory as read/write;
in response to the request, changing the identity of the portion of memory to the third ID;
receiving a new version of the computer program;
saving the new version of the computer program in the portion of memory; and
changing the identity of the portion of memory to the first ID to again cause the portion of memory to be hidden from the user.

15. The method of claim 14, wherein the third ID identifies the portion of memory as read/write.

16. In a peripheral hardware device configured to be connected to a computing device, a method for loading onto the computing device a hardware device driver program stored in a portion of memory on the hardware device, the method comprising:
connecting to the computing device;

presenting a first identification (ID) to the computing device, where the first ID is mapped to the portion of memory in which a set of instructions are stored and identifies the portion of memory as read-only;

transferring the set of instructions from the portion of memory to the computing device;

hiding, via execution of the set of instructions on the computing device, the portion of memory from a user of the computing device after the set of instructions is transferred;

receiving an input from the user requesting access to the portion of memory; and in response to the request, changing the first ID to a second ID that causes the portion of memory to be visible to the user of the computing device and that identifies the portion of memory as read only.

17. The method of claim 16, further comprising:

after causing the portion of memory to be hidden, receiving a request from the computing device to change an identity of the portion of memory to a third ID that causes the portion of memory to be visible to the user;

in response to the request from the computing device, changing the identity of the portion of memory to the third ID;

receiving a new version of the computer program; and writing the new version of the computer program to the portion of memory.

18. The method of claim 17, wherein the third ID identifies the portion of memory as read/write.

19. The method of claim 17, further comprising, after saving the new version of the computer program in the portion of memory, changing the identity of the portion of memory to the first ID to again cause the portion of memory to be hidden from the user.

* * * * *